(No Model.)
A. P. DODGE.
THILL COUPLING.
No. 499,973. Patented June 20, 1893.
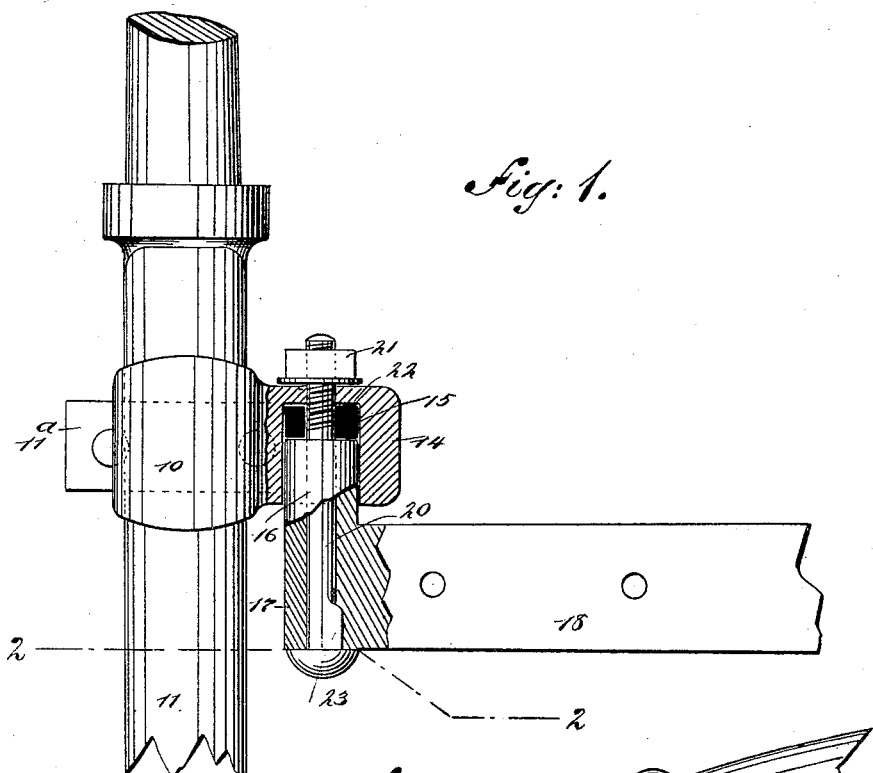
Fig: 1.
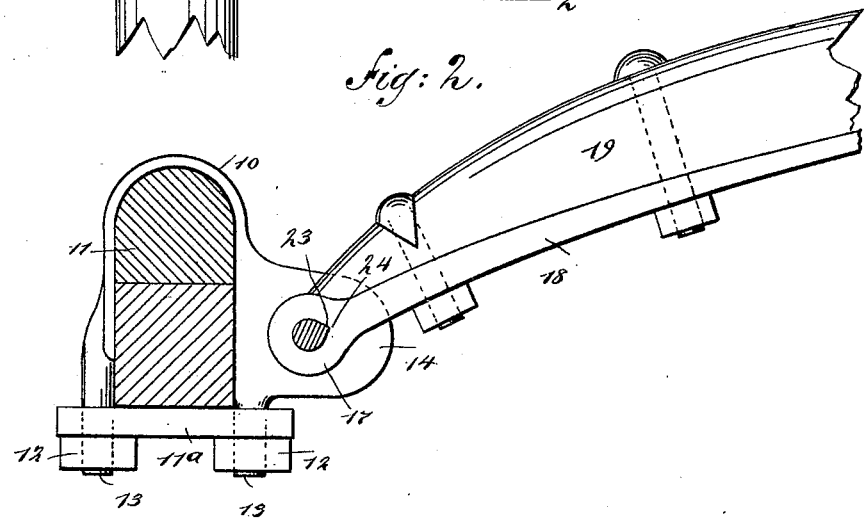
Fig: 2.
WITNESSES:
Chas. Nida
C. Sedgwick
INVENTOR
A. P. Dodge
BY
Munn & Co.
ATTORNEYS.

UNITED STATES PATENT OFFICE.

ALONZO P. DODGE, OF HUNTINGTON, NEW YORK.

THILL-COUPLING.

SPECIFICATION forming part of Letters Patent No. 499,973, dated June 20, 1893.

Application filed February 24, 1893. Serial No. 463,624. (No model.)

*To all whom it may concern:*

Be it known that I, ALONZO P. DODGE, of Huntington, in the county of Suffolk and State of New York, have invented a new and Improved Thill-Coupling, of which the following is a full, clear, and exact description.

My invention relates to improvements in thill couplings, and the object of my invention is to produce an extremely cheap and simple coupling by means of which the thills may be readily attached to or detached from a vehicle, and also to construct the coupling so that there will be practically no wear on the coupling bolt, and so that the parts cannot become accidentally displaced.

To this end, my invention consists in a thill coupling, the construction of which will be hereinafter described and claimed.

Reference is to be had to the accompanying drawings forming a part of this specification, in which similar figures of reference indicate corresponding parts in both the views.

Figure 1 is a broken plan view, partly in section, of a coupling embodying my invention; and Fig. 2 is a vertical section on the line 2—2 in Fig. 1.

The coupling has a clip 10, substantially like the usual axle clip, and this clip fits upon the axle 11, being held thereto in the usual way by nuts 12 on the under side of the bolts 13, which are formed on the clip, and which project through the clip-plate 11ª, on the bottom of the axle. The part of the clip described is exactly like the usual axle clips. On the front of the clip, however, is a novel arrangement for connection with the thill iron, consisting of a forwardly-extending lug 14, which has a socket 15 therein, opening on the inner side of the lug, and having parallel walls. This socket is adapted to receive the cylindrical and elongated crank-like end 16, of the knuckle 17 which is formed in the usual way on the rear end of the thill iron 18, and the latter is bolted in the customary manner to the thill 19.

The crank end 16 of the knuckle 17 is of the same diameter through its entire length, fits snugly but turns easily in the socket 15 of the lug 14, and it is held in place by a bolt 20 which projects longitudinally through the knuckle and crank 16 thereof, and through the lug 14, the bolt being fastened by a suitable nut 21, and on the inner end of the socket is a thick rubber washer 22, which prevents lost motion and consequent rattle. The bolt is preferably provided near its edge with a web 23, fitting in a corresponding groove 24 of the thill iron knuckle 17, so that the bolt cannot turn independently of the knuckle.

It will be seen that this coupling may be very easily applied to a vehicle, and that the thills may be detached by simply removing the nut 21 and pulling the crank end 16 from the socket 15, and it will also be observed that there is practically no wear on the bolt 20, and as the crank 16 may be made comparatively large, the coupling is a very strong one.

When the thills are applied, the clips 10 are placed on the axle in the usual way, and there is sufficient spring to the thills to enable them to be sprung inward and then allow the crank ends 16 to spring outward in the sockets 15 of the lugs 14, near the opposite ends of the axle. By making the crank ends of the same diameter throughout their entire length and the sockets with parallel walls, the thills are not likely to become detached even should the nut come off and the bolt drop out.

Having thus described my invention, I claim as new and desire to secure by Letters Patent—

An improved thill coupling, consisting of an axle clip provided with a forwardly extending lug having in its inner side a socket whose walls are parallel, a thill iron having on its knuckle a crank or extended end to enter the said socket, the said crank or end being of the same diameter throughout its entire length, a bolt provided with a web at its headed end and passing through the knuckle the crank thereof and the lug of the clip, and a nut on the said bolt, substantially as herein shown and described.

ALONZO P. DODGE.

Witnesses:
CAMELLUS P. ROGERS,
ROSS W. DOWNS.